United States Patent [19]

Van Alem et al.

[11] 4,135,083
[45] Jan. 16, 1979

[54] OPTICAL SCANNING DEVICE

[75] Inventors: Antonius A. M. Van Alem; Lieuwe Boonstra, both of Eindhoven; Francois D. Dekker, Amsterdam; Johannes T. A. Van de Veerdonk, Eindhoven, all of Netherlands

[73] Assignee: U.S. Philips Corporation, New York, N.Y.

[21] Appl. No.: 787,610

[22] Filed: Apr. 14, 1977

[30] Foreign Application Priority Data

May 12, 1976 [NL] Netherlands ............... 7605043

[51] Int. Cl.$^2$ .................................. G01J 1/20
[52] U.S. Cl. .................. 250/201; 179/100.3 V; 358/128
[58] Field of Search ............ 179/100.3 V; 250/201; 358/128

[56] References Cited

U.S. PATENT DOCUMENTS

| 4,032,776 | 6/1977 | Van Rosmalen | 250/201 |
| 4,063,287 | 12/1977 | Van Rosmalen | 358/128 |
| 4,074,312 | 2/1978 | Van Rosmalen | 250/201 X |

Primary Examiner—Lawrence J. Dahl
Attorney, Agent, or Firm—Frank R. Trifari; Simon L. Cohen

[57] ABSTRACT

An optical scanning device scans recording tracks on a record carrier with the aid of a beam of radiation, while an objective, which concentrates the beam of radiation to a scanning spot, performs automatic electrically controlled movements in a direction perpendicular to the plane of the record carrier with the aid of a focussing bearing arrangement, so as to ensure a continuous focussing of the scanning spot on the recording tracks. Moreover, in order to follow the oscillations of the recording track, the objective also performs electrically controlled movements which are such that the scanning spot moves at least substantially parallel to the plane of the record carrier.

14 Claims, 10 Drawing Figures

OPTICAL SCANNING DEVICE

The invention relates to an optical scanning device which is suitable for scanning recording tracks in a recording surface of a record carrier with the aid of a beam of radiation which is obtained from a radiation source, and more specifically for scanning video and/or audio recording tracks in a reflecting recording surface of a rotating video or audio disc with the aid of a light beam, comprising:
a frame,
an objective with a lens system and an optical axis, suitable for concentrating the beam of radiation to a scanning spot in a focussing plane,
a focussing bearing-arrangement for enabling focussing movements of the objective relative to the frame in a direction which at least substantially coincides with the optical axis, so as to enable incidental deviations from a coarse position of the recording plane of the record carrier in a direction perpendicular to the recording plane to be followed with the focussing plane, and
electrically controllable focussing means for electrically effecting and controlling the focussing movements of the objective.

Such an optical scanning device, intended for use in a video disc player, is known. In a series of articles concerning the Philips VLP video disc system in the magazine "Philips Technical Review", Vol. 33, 1973, No. 7, pages 178–193, a scanning device is described in which said electrically controllable focussing means for controlling the focussing movements comprise a magnetic circuit with an axially magnetized permanent magnet with a central opening having soft-iron end plates at the two axial ends, as well as a hollow cylindrical soft-iron core which is disposed in the central opening. A cylindrical coil arrangement which is coaxially disposed around the soft-iron core is rigidly connected to the objective and is axially movable in an annular air gap around the soft-iron core. The focussing bearing arrangement of the objective employs a number of leaf springs which each are connected to the objective with their one end and to the frame with their other end, so that a limited movability of the objective in an axial direction is obtained, but movements in a radial direction are substantially prevented.

For playing a video disc it is necessary that in addition to means for focussing the beam of radiation onto the recording track means are provided for continuously following the track in a radial direction by means of the very small scanning spot which is projected onto the disc by the objective. Oscillations in a radial direction of the track are produced owing to irregularities in the recording process and owing to axial and radial movements of the disc during its rotation. Therefore, in addition to a focussing bearing-arrangement for the purpose of focussing, provisions are necessary for following the track of the disc. This may for example be effected, as is also described in the previously cited magazine, with the aid of a movable mirror which is disposed in the radiation path of a laser beam. The mirror can be controlled under the influence of a control signal which is related to the deviation of the scanning spot relative to the track on the disc. Such mirrors can deflect the laser beam through a small angle, so that the objective should also be capable of handling and focussing laser beams which do not enter the objective perfectly along the optical axis and which moreover may be slightly eccentric. This demands a lens system which is of good quality over a certain "field". For said known objective a circular field with a diameter of approx. 400 microns is needed.

Realizing a field of such dimensions is a stringent optical requirement for a lens system which must be capable of focussing a laser beam to a read spot with a diameter of approx. 0.9 micron. It is an object of the invention to provide an optical scanning device, of the type mentioned in the preamble which imposes less stringent requirements on the lens system of the objective (in particular in respect of the field dimensions) and which, depending on the embodiment, also has further advantages. The invention is characterized in that the scanning apparatus furthermore comprises:
a tracking bearing-arrangement for enabling tracking movements of the objective relative to the frame, so as to enable incidental deviations from a coarse position of the recording track in a direction normal to the recording track and disposed in the recording plane to be followed with the scanning spot, and
electrically controllable tracking means for electrically effecting and controlling the tracking movements of the objective.

In a scanning device in accordance with the invention it is possible to ensure by means of the said electrically controllable tracking means that the optical axis of the objective always follows the recording track. As a result of this a smaller field is needed with a diameter of approximately 100 microns instead of a diameter of 400 microns. Such a field dimension remains always necessary in view of tolerances and play. Thus the cost of the objective is favorable influenced in two manners. In the first place the optical specifications can be made less stringent; in the second place the requirements imposed on the accurate alignment of the lenses in the lens system may be less stringent, though this will be at the expense of a part of the available field.

The invention enables a more compact construction of the means required for scanning a record carrier to be obtained with the aid of an embodiment which is characterized in that in addition to the lens system further optical elements and/or radiation-sensitive electronic elements which are needed on the radiation path of the radiation beam are incorporated in the objective. For example, when a low-power radiation-source of small size (such as a laser diode) suffices, it is possible to include the radiation source itself in the objective. In the case of a radiation source of higher power and larger size (such as a gas laser) an embodiment may be used in which the radiation source is situated outside the objective and a filamentary flexible radiation guide or optic fiber is connected to the objective at one end and is disposed in the radiation beam from the radiation source at its other end. An advantage of this embodiment is that although the radiation source is disposed outside the objective and may rigidly be connected to the stationary parts of a video player or similar apparatus, no movable mirror, electrically controlled via a control circuit, is necessary and that furthermore the orientation of the radiation beam relative to the lens system is invariable. This results in minimal requirements with respect to the required field of the lens system. The optic fiber then serves as a flexible connection between the objective and the radiation source. Modern optic fibers of glass or plastic can combine a high efficiency with sufficient flexibility to ensure that no undesired forces are exerted on the moving objective.

In view of the generally long narrow structure of the objective it is difficult in the last two embodiments to find a suitable solution for receiving the radiation beam which is reflected by the record carrier and aiming this beam at the appropriate radiation-sensitive electronic elements. It may be advantageous to employ an embodiment in which in the objective and outside the part of the radiation path which is disposed between the radiation source and the lens system one or more reflecting surfaces are provided for reflecting the reflected radiation beam (for example in the transverse direction). In this respect it is advantageous, in view of the small space which is generally available, to utilize an embodiment which is characterized in that the reflecting surface(s) consist(s) of the surface of a single mirror which has a radiation-transmitting portion (for example a hole) for transmitting the part of the radiation beam which is directed to the lens system.

For the construction of a scanning apparatus in accordance with the invention an embodiment is of significance which is characterized in that the focussing bearing-arrangement consists of a parallel guide-arrangement and that the tracking bearing arrangement consists of a pivot-bearing arrangement which enables a limited pivoting movement of the objective relative to the frame about a pivoting axis which is transverse to its optical axis.

In this embodiment the optical axis of the objective follows the positional deviations from the track by pivoting movements of the complete objective. It is apparent that a suitable location of the pivoting axis will have to be selected. The most suitable location depends on the design of the apparatus in which the scanning device is to be incorporated. However, unless the radiation beam has an orientation which is stable relative to the lens system such as when the radiation source is integrated in the objective or connected to it through an optic fibre, there is obviously no point in arranging the pivoting axis in the principal plane of the lens system. As is known from theoretical optics the principal plane is to be understood to means a plane which may be assumed to contain a single imaginary lens which has the same properties as the actual lens system. Limited pivoting movements of the lens system relative to a stationary radiation source about a pivoting axis in the principal plane do not result in movements of the scanning spot.

As previously stated, a scanning device is known in which the electrically controllable focussing means for electrically effecting and controlling the focussing movements of the objective comprise: a permanent magnetic circuit which comprises an axially magnetized permanent-magnet with a central opening and with soft-iron end plates at the two axial ends, as well as a hollow cylindrical soft-iron core fitted in the central opening and a cylindrical coil construction which is rigidly connected to the objective and is disposed coaxially around the soft-iron core, which construction is axially movable in an annular air gap around the soft-iron core. In this respect an embodiment is of advantage which is characterized in that the focussing bearing-arrangement consists of a sleeve bearing arrangement comprising a first bearing bush which is connected to the frame and a second bearing bush which is connected to the objective and which is movable relative to the first bearing bush, and that the first bearing bush is pivotably connected to the frame by means of the tracking bearing-arrangement and the said coil construction comprises two tracking coils which are disposed symmetrically one on each side of the pivoting axis. Preferably, in view of a high efficiency of the coil construction, an embodiment is used which is characterized in that between each of the two soft-iron end plates and the cylindrical soft-iron core an annular air gap is formed and that of each tracking coil a part of the turns is disposed in the one air gap and an other part of the turns in the other air gap, in such a way that the said parts of the turns provide an equally directed contribution to an electrically generated pivoting torque.

Another method of pivoting the objective is possible with an embodiment of the invention which is characterized in that the focussing bearing-arrangement consists of a parallel guide-arrangement and that the tracking bearing-arrangement consists of a parallel guide-arrangement and that the tracking bearing-arrangement consists of a pivot-bearing arrangement for enabling a limited pivoting movement of the objective relative to the frame about a pivoting axis which is disposed parallel to and at some distance from the optical axis. By means of this embodiment it is possible, as is shown in the drawing, to realize a scanning device in which the radiation source is rigidly connected to the frame and focussing and tracking are effected exclusively by movements of the objective without the help of other optical elements or an optical fiber.

A suitable and simple construction can be obtained if the device comprises a movable objective support, the focussing bearing-arrangement movably connects the objective support to the frame, and the tracking bearing-arrangement movably connects the objective to the objective support.

In particular when the bandwidth of the scanning device need not comply with excessively stringent requirements, for example when the device serves for scanning audio recording tracks of an optically readable audio disc, it may be advantageous to use an embodiment in which the focussing bearing-arrangement consists of a number of identical and parallel leaf springs which are spaced from each other, which springs with one of their ends are connected to the frame and with their other ends to the objective support, and in which furthermore the tracking bearing arrangement consists of a number of identical leaf springs which are spaced from each other in a crosswise fashion, which springs with one of their ends are connected to the objective support and with their other ends to the objective. These steps result in a simple robust construction which requires no maintenance. In order to avoid unnecessary loss of power and parasitic resonances it is favorable when the electrically controllable focussing means consist of a cylindrical axially magnetized permanent magnet which is connected to the frame, and an annular focussing coil which is connected to the objective support and which is disposed concentrically around said magnet, said magnet and coil both being coaxial with the objective.

A high efficiency of the electrical tracking means is attainable with an embodiment which is characterized in that the electrically controllable tracking means consist of an assembly of two cylindrical axially magnetized permanent magnets, which assembly is connected to the objective support, which magnets are mounted against each other with ends of like polarity, and of an annular coil which is connected to the objective and which is concentrically arranged around said assembly, and that the axis of these tracking means crosses the optical axis of the objective at some distance and opposite the pivoting axis of the tracking bearing-arrangement.

The invention will now be described in more detail with reference to the drawing, in which:

FIG. 5 illustrates the principle of a similar scanning device, mainly in cross-section, but in which the objective is movable in a bearing bush which bush in its turn is pivotably connected to the frame, FIG. 6 in perspective shows the shape and the position relative to the pivoting axis of two tracking coils for controlling the pivoting movements of the scanning device of FIG. 5.

Figure 1:
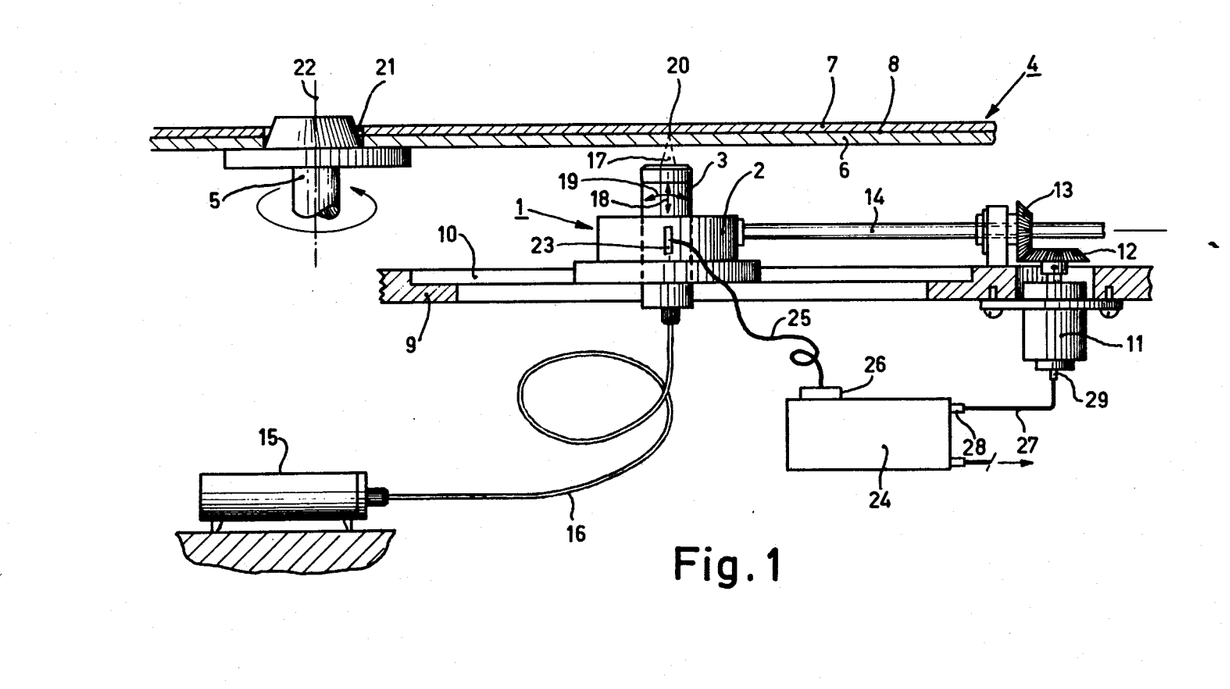
FIG. 1 schematically shows a part of a video disc player in which an optical scanning device in accordance with the invention is used.

In FIG. 1 an optical scanning device bears the general reference numeral 1. It comprises a frame 2, which frame includes all parts of the device which do not move along with an objective 3. The scanning device forms part of a video disc player which is suitable for playing a video disc 4 which is disposed on a rotating spindle 5. The video disc consists of a transparent part 6 as well as a protective coating 7 (which need not be transparent) between which a recording surface with an extremely thin reflecting layer 8 which is provided with the video information in the form of small recesses and/or raised portions. The frame 2 of the scanning device is movably mounted on a base plate 9 of the video player. It is movable in a slot 10 with the aid of an electric motor 11 which via two conical gear wheels 12 and 13, of which the last-mentioned gear wheel contains an internal nut, moves a lead screw 14. The recording track on the video disc 4 takes the form of a spiral, the consecutive turns of the spiral being situated very near to each other at a distance of the order of magnitude of a few microns.

With the aid of a gas laser 15 a powerful radiation beam is produced which via a radiation guide 16 is led to the underside of the objective 3. Such radiation guides are generally known in optics; they consist of a transparent core surrounded by a transparent cladding of a material with a different refractive index than the core, so that the radiation once it is present in the core cannot emerge via the cladding. The part of the radiation beam which emerges from the objective is shown in the drawing and bears the reference numeral 17. It is one of the functions of the scanning device to focus this part of the radiation beam onto the layer 8, in other words to ensure that the focussing plane of the objective and the recording plane coincide as far as possible while the disc is being played. For this purpose the objective is movable to and fro in the direction of its optical axis. in the drawing this is symbolically represented by a double-headed arrow with the reference numeral 18. The objective is moreover pivotable about an axis which is perpendicular to the plane of drawing, which pivoting movement is indicated by the curved double-headed arrow 19. This pivoting movement serves to keep the scanning spot 20 of the radiation beam 17 constantly aimed at the recording track of the video disc. During the rotation of the video disc the track will oscillate in a direction transverse to the axis of rotation 22 of the spindle 5 owing to irregularities in the course of the track on the disc and owing to the eccentricity of the central opening 21 and the spindle 5. These oscillations are generally referred to as "radial oscillations", while following these oscillations with the radiation spot 20 is generally referred to by the term "radial tracking". The objective 3 is included in two control circuits that assist in effecting the necessary focussing and radial tracking. These circuits will not be described in more detail in the present Application, because they are irrelevant for the invention; however, for information in respect of focussing and radial-tracking techniques which may be used, reference is made to the article in the previously mentioned magazine.

The objective 3 accommodates all the optical elements as well as the electronic radiation-sensitive elements which are necessary for detecting the position of the scanning spot and for scanning the video and audio information contained in the layer 8. The objective 3 and the frame 2 have electro-magnetic focussing and tracking means which co-operate with each other for moving the objective to and fro and pivoting it in an electrically controlled fashion. Via a multi-pole connector 23, the electronic elements in the objective and said the said electromagnetic means are connected to electronic circuits, which are accommodated in the video player and which are symbolically represented in a drawing as a box 24. Via a multi-core electrical conductor 25 and a multi-pole connector 26 the connector 23 is connected to the box 24. Via an electrical conductor 27 and the connectors 28 and 29 for power supply and control the motor 11 is also connected to the box 24. The motor 11 need not be controlled so that the focussing-tracking device 1 is constantly moved with a speed which corresponds to the average pitch of the track on the video disc 4. It is alternatively possible to move the focussing-tracking device intermittently, tracking being effected by means of the pivoting movement of the objective 3 during the time that said device is stationary.

Figure 2:
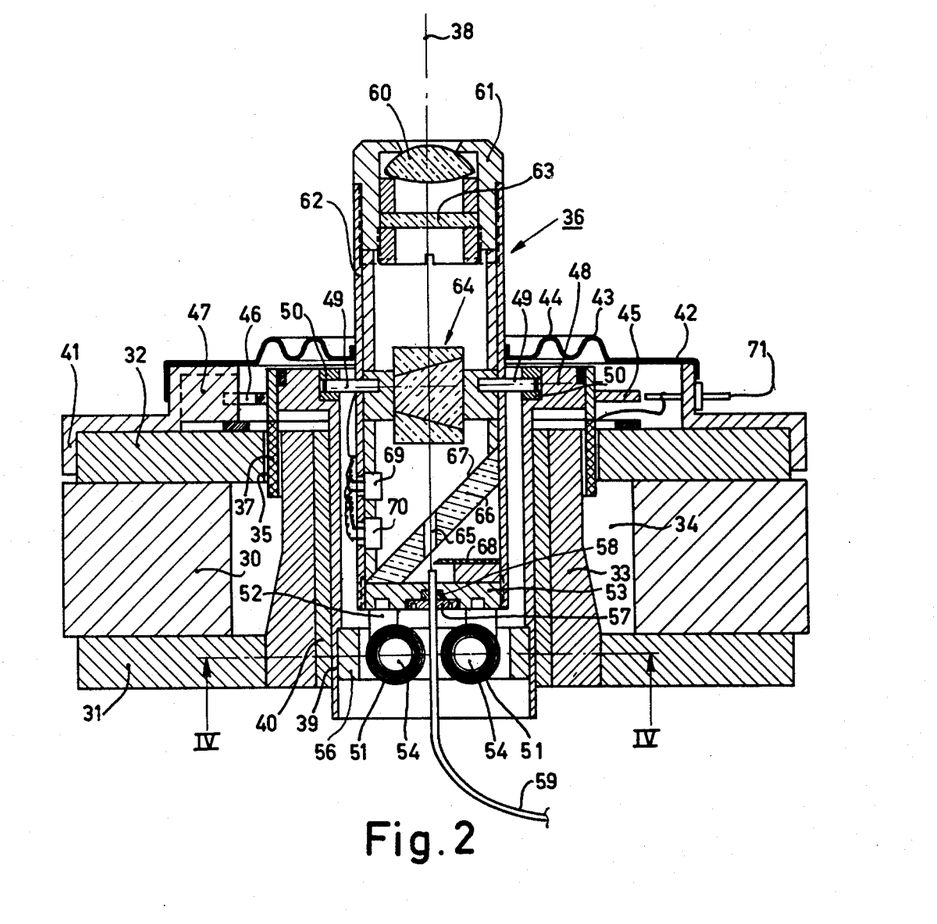
FIG. 2 is a cross-section of a scanning device in which the objective is pivotable about a pivoting axis which is perpendicular to its optical axis and is journalled in a movable bearing bush.

FIG. 2 shows how a scanning device may be constructed. The frame of this scanning device comprises an axially magnetized annular permanent magnet 30, two soft-iron end-plates 31 and 32 at the two axial ends, one on each side of the magnet, as well as a hollow cylindrical soft-iron core 33 which is fitted in the central opening 34 of the permanent magnet. Between the upper end plate 32 and the core 33 an annular air-gap 35 is formed. In this gap a cylindrical coil construction 37 is movable coil 37 is rigidly connected to the objective 36 and is coaxially disposed around the soft-iron core 33. The construction 37 is connected to a bearing bush 39 which with the objective is movable in the direction of its optical axis 38, which bush together with a bush 40 which is rigidly connected to the frame serves for the parallel guidance of the objective and constitutes the focussing bearing-arrangement.

On top of the end plate 32 a plastic cover 41 is disposed to which a rubber cuff 42 is attached. This cuff has a number of concentric folds 43 and 44 and is connected to the objective 36. The shape of the cuff is such that it ensures that movements in the direction of the optical axis 38 and slight pivoting movements are only slightly impeded.

Figure 3:
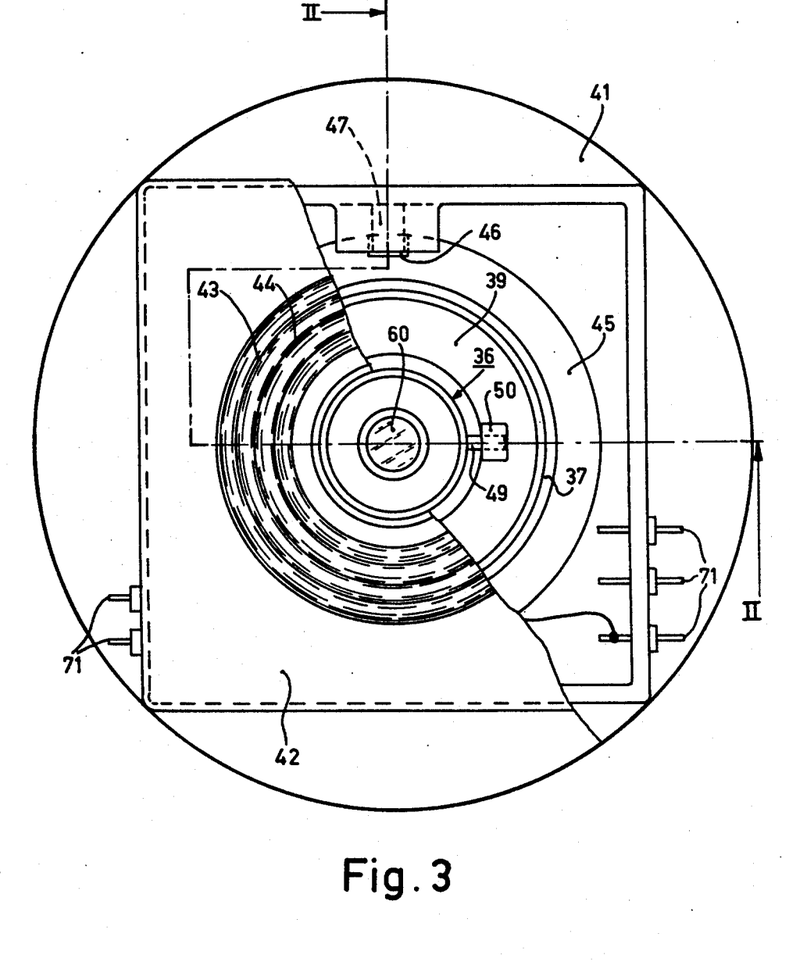
FIG. 3 is a plan view of the scanning device of FIG. 2 with the cover partly removed.

Around the coil construction 37 an annular disc 45 is mounted which at two oppodite sides, also see FIG. 3, has local notches 46. These notches cooperate with locally formed ridges 47 of the cover 41, thus preventing the objective 36 together with the bearing bush 39 as a whole from rotating about its optical axis 38.

Figure 4:
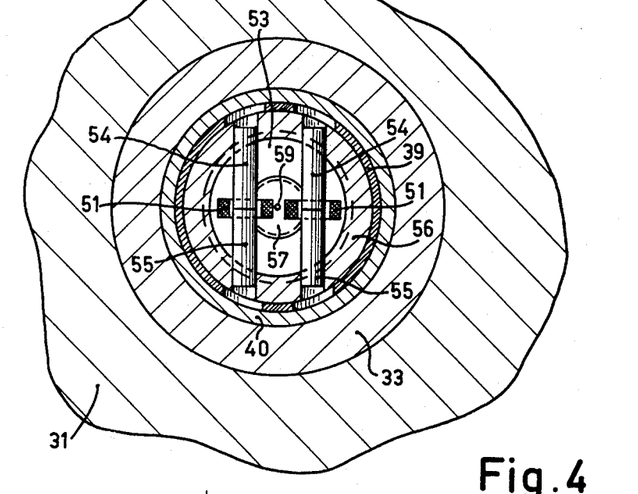
FIG. 4 is a cross-section of a part of the scanning device of FIG. 2.

The objective is pivotable relative to the bearing bush 39 about a pivoting axis 48. For this purpose a pivot bearing-arrangement is provided which comprises two bearing pins 49 as well as two bearing bushes 50. For controlling the pivoting movements of the objective two annular tracking coils 51 are mounted underneath the bottom 53 of the objective with the aid of supports 52, also see FIG. 4. The coils 51 are arranged around two cylindrical axially magnetized permanent magnets 54 and 55 with play. The poles of these permanent magnets are located at their ends. They are mounted with like poles facing each other and against each other; their other ends are mounted in a soft iron ring 56. This method of mounting results in a radially directed permanent magnetic field at the location where the like poles of the magnets 54 and 55 adjoin each other, so that upon energization of the coils 51 these are subjected to a force in accordance with the axis of the cylindrical magnets. The direction of the current then determines the direction of pivoting.

In the bottom 53 of the objective 36 a light guide 59 is clamped with the aid of a threaded cap 57 and a deformable plastic ring 58. This light guide is mounted in the center of the bottom 53 and directs a radiation beam towards the other end of the objective 36 via the optical axis 38. At this end a lens system is located which consists of a single aspherical lens 60, which by means of a threaded cap 61 is fitted in a lens mount 62. In addition to this lens a number of further optical elements are accommodated in the objective, namely a quarter-wavelength plate 63, a Wollaston prism 64, as well as a mirror 66 in which an opening 65 is formed. This mirror is provided with a reflecting surface 67. Furthermore, the objective accommodates a stop plate 68 which stops out half the radiation beam which emerges from the light guide 59, as well as two radiation-sensitive diodes 69 and 70 which serve for converting a light-beam modulation into high-frequency video and audio information and into information about the position of the focussing plate relative to the recording plane.

The electrical connections of the coils 51, the diodes 69, 70 and the coil 37 are not shown in the drawing. However, the connecting wires of the coils 51 and the diodes 69 and 70 are preferably led upwards through the wall of the bearing bush 39 near the bearing pins 49, so that they can be attached to mounting pins 71 (see FIG. 3) which are fitted in the cover 41.

The optical elements present in the objective 36, the diodes 69, 70 as well as the stop plate 68 accommodated in the objective 36 together constitute a device for reading optical information about which comprehensive data can be found in the Applicant's previously application Ser. No. 543,111 filed Jan. 22, 1975, now U.S. Pat. No. 3,969,576, (herewith incorporated by reference). Said Application also describes how automatic focussing of the objective 36 is effected. For automatic tracking use is made of a system as described in the Netherlands patent application No. 7,401,470, which has been laid open for public inspection. This system employs a periodic small amplitude oscillation of the information track on the record carrier, as a result of which a signal of small amplitude is superimposed on the light-beam modulation. This superimposed signal contains information about the position of the scanning spot relative to the recording track.

Figures 5, 6:
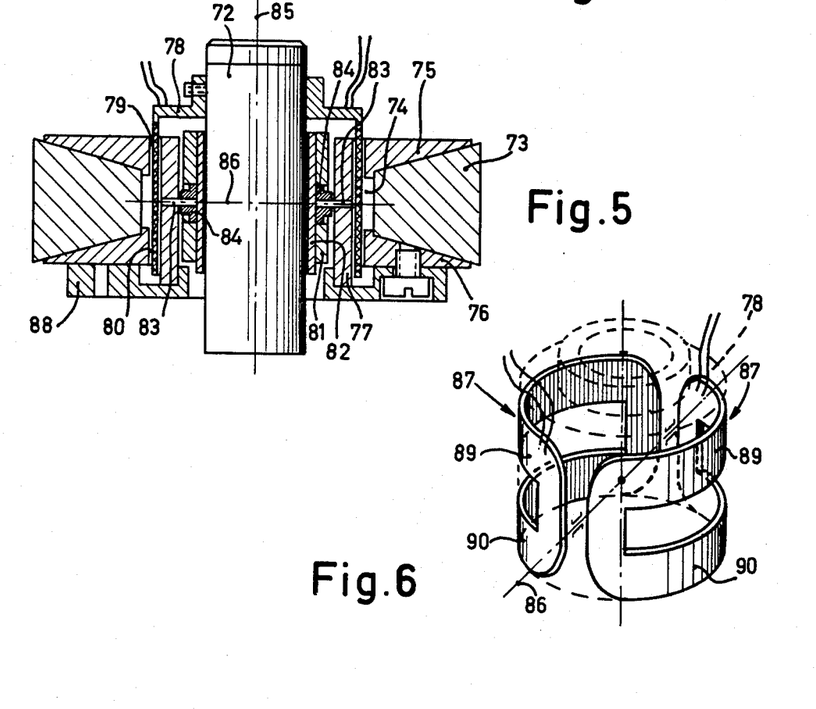
Figure 7:
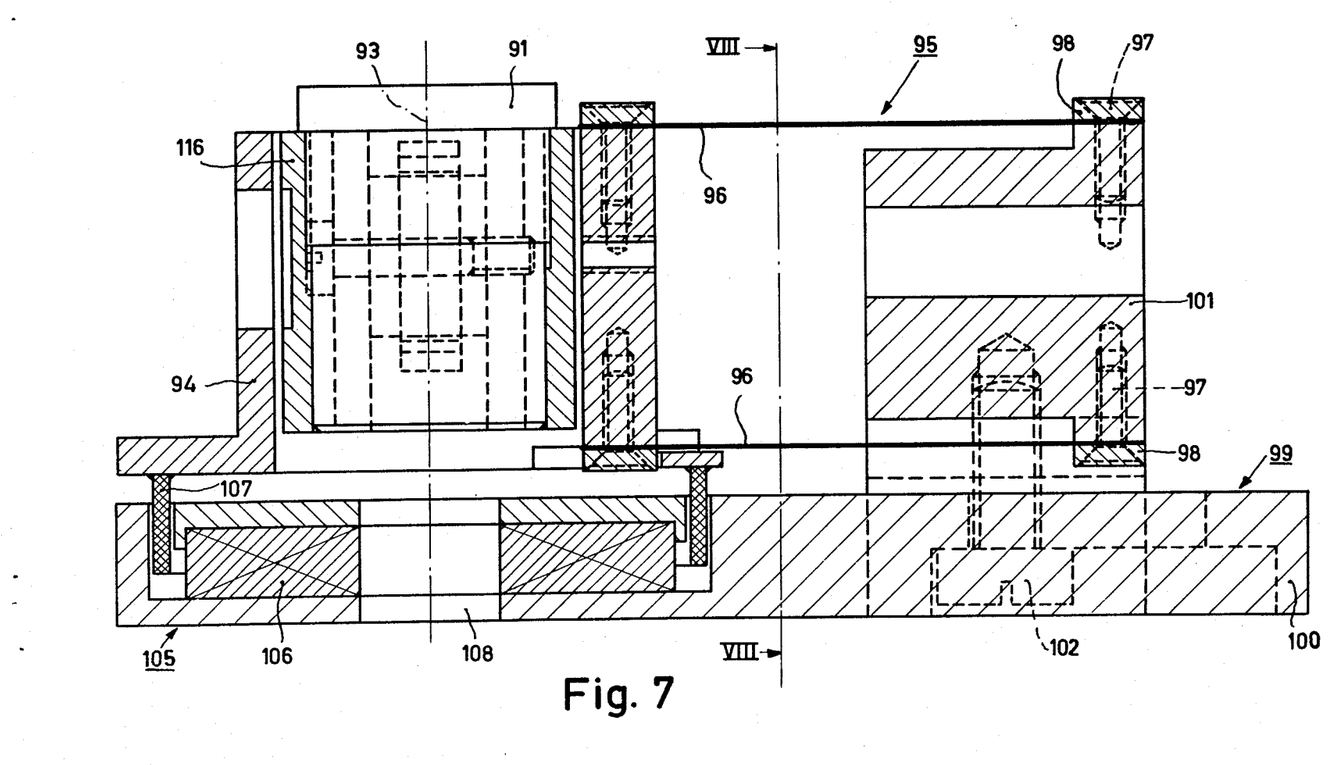
FIG. 7 is a cross-section of a scanning device in which the objective is pivotable about a pivoting axis parallel to its optical axis and in which both the focussing bearing-arrangement and the tracking bearing-arrangement employ leaf springs.
Figure 8:
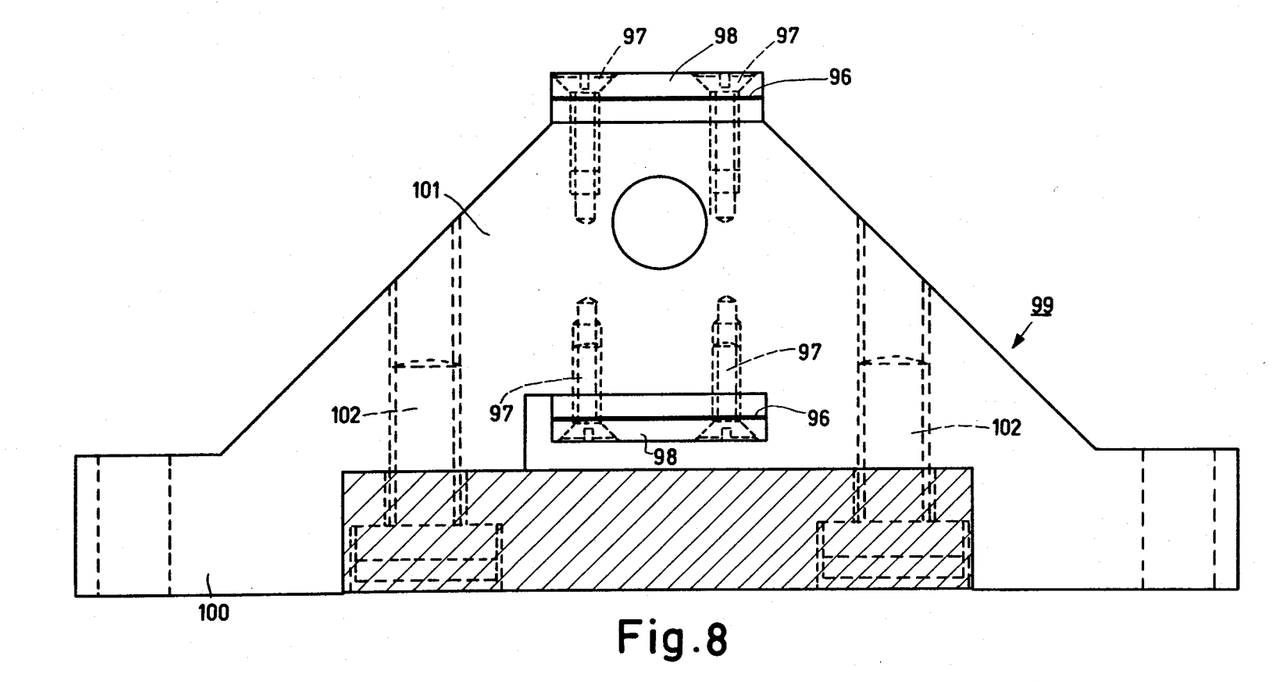
FIG. 8 is a cross-section in accordance with the line VIII—VIII in FIG. 7.
Figure 9:
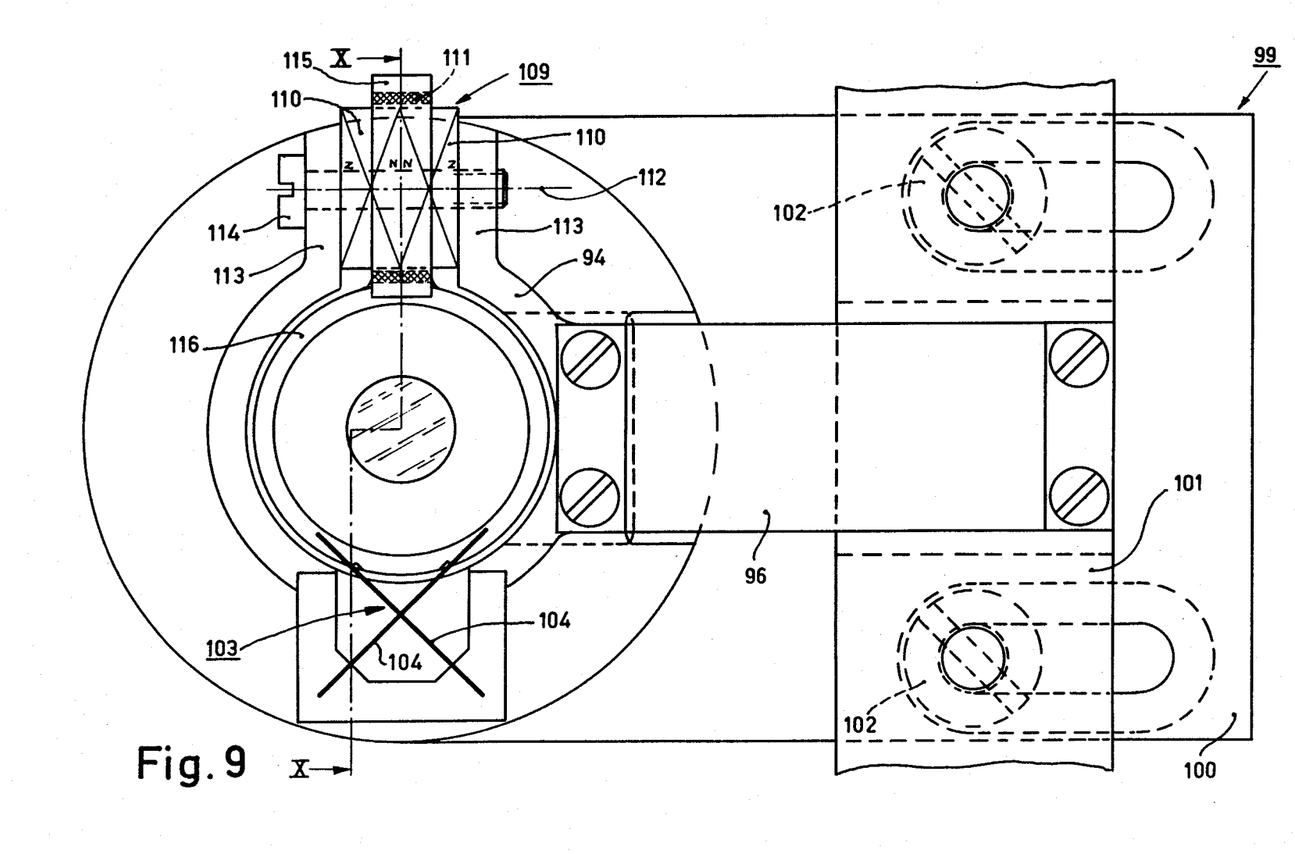
FIG. 9 is a plan view of the scanning device of FIG. 7.
Figure 10:
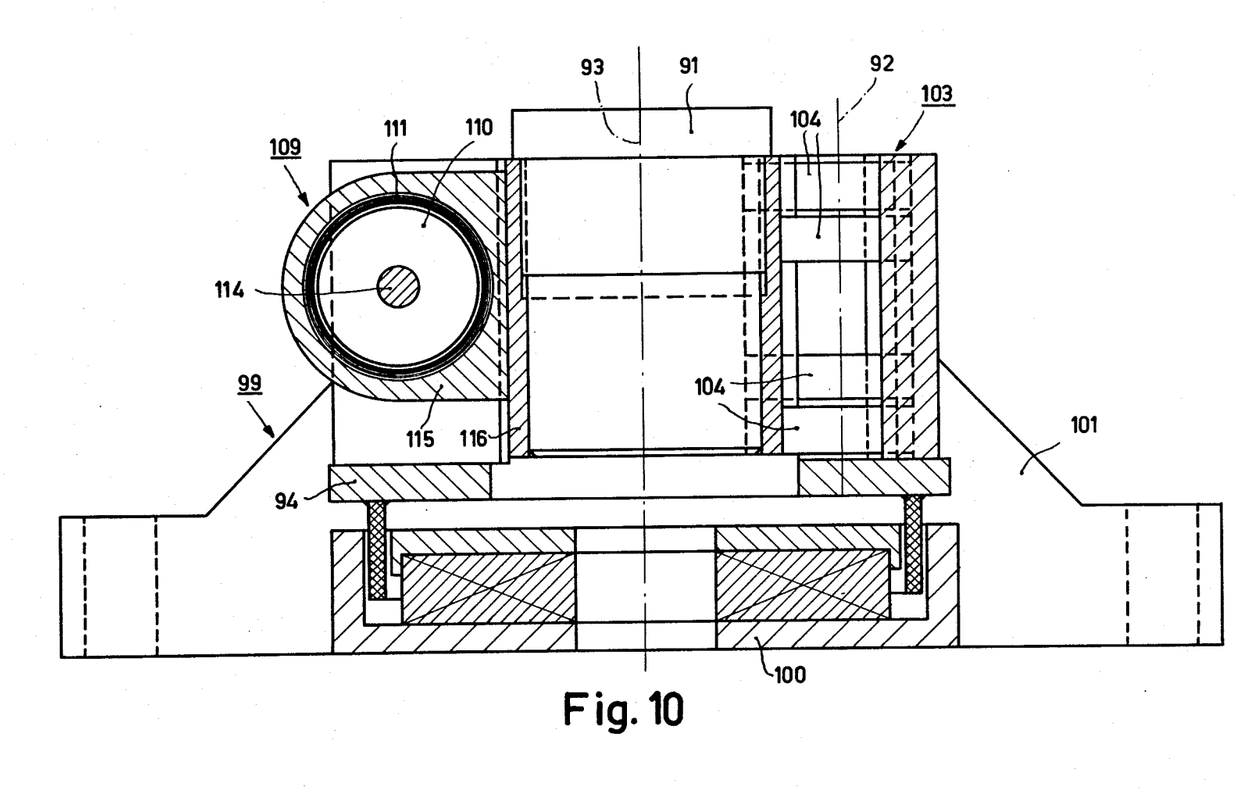
FIG. 10 is a cross-section along the line X—X in FIG. 9.

The objective of the scanning device in FIG. 5 bears the reference numeral 72. The permanent magnetic circuit has an axially magnetized permanent-magnet 73 with a central opening 74 and two soft-iron end plates 75 and 76 at the two axial ends. A hollow soft-iron core 77 is mounted in the central opening 74. A cylindrical coil construction 78 which is coaxially arranged around the soft-iron core 77 is fixed to the objective 72 and is axially movable in the annular air gap 79 between the end plate 75 and the core 77 and a second annular air gap 80 between the end plate 76 and the core 77. The focussing bearing-arrangement is a sleeve bearing arrangement for the parallel guidance of the objective 72 and comprises a first bearing bush 81 which is connected to the objective and which is axially movable relative to the bearing bush 81. The bearing bush 81 is rigidly connected to the core 77 with the aid of two bearing pins 83. These bearing pins are rigidly mounted in the core 77, while two bearing bushes 84, which are rigidly mounted in the bearing bush 81, are pivotable on the pins. In the present embodiment the bearing bush 81, as previously stated, is rigidly connected to the objective 72 and movable in the bearing bush 81. Of course, the outer wall of the objective 72 itself may alternatively be used as a part of the sleeve bearing-arrangement.

The major advantage of the construction in accordance with FIG. 5 is that the objective 72 is movable in the direction of its optical axis 85 and, for the tracking movement, about the pivoting axis 86 with the aid of a single electro-magnetic system only, the permanent magnet 73 performing a dual function. In comparison with the embodiment of FIG. 2 the mass to be moved in the direction of the optical axis 85 is thus reduced. The coil construction 78 is provided with two coils 87 which are symmetrically disposed one on each side of the pivoting axis 86, also see FIG. 6, which coils serve both for focussing and for tracking. With the aid of a mounting plate 88, see FIG. 5, on which the cylindrical soft-iron core 77 is mounted, a construction is obtained which is such that between each of the end plates 75 and 76 and the core 77 an annular air gap is formed, namely the air gaps 79 and 80. Thus, a high efficiency of the electro-magnetic means for the axial movement and for pivoting the objective 72 can be obtained. Of each coil 87 a part 89 of the turns, see FIG. 6, extend into the air gap 79 and an other part 90 in the air gap 80. These parts 89 and 90 are situated so that they provide an equally directed contribution to an electrically generated torque about the pivoting axis 86.

The electromagnetic forces which are exerted on the parts 89 and 90 of the coils 87 are directed axially. Focussing movements can be effected if the current directions through the corresponding parts 89 and 90 of the two coils are selected so that the axial forces have the same direction and are equal. If this is not the case a pivoting movement of the objective is obtained, which may be used for the purpose of tracking.

FIGS. 7 to 10 relate to a scanning device in which an objective 91 is pivotable about a pivoting axis 92 parallel to the optical axis 93 of the objective. A movable objective support 94 is connected to a frame 99 by means of a focussing bearing-arrangement 95 consisting of two leaf springs 96 which are arranged parallel to each other and with the aid of screws 97 and clamping plates 98. This frame consists of a base plate 100 on which a support 101 is secured with bolts 102.

The tracking bearing-arrangement 103 connects the objective 91 movably to the objective support 94 and consists of four identical leaf springs 104 which are spaced from each other in a crosswise fashion, which springs are glued to the objective support 94 with one of their ends and are glued to the objective 91 with their other ends.

The electrically controllable focussing means 105 consists of an axially magnetized permanent magnet 106 which is glued to the frame 99, and an annular focussing coil 107 which is arranged concentrically around said magnet and is glued to the objective support 94. Both the magnet and the coil are coaxial with the objective 91 and in the magnet 106 a hole 108 is formed for the passage of a radiation beam obtained from a stationary radiation source, not shown. The electrically controllable tracking means 109 consists of an assembly of two cylindrical axially magnetized permanent magnets 110 connected to the objective support 94, which magnets are mounted against each other with ends of like polarity, and of an annular coil 111 which is concentrically arranged around this assembly and connected to the objective 91. The axis 112 of these tracking means crosses the optical axis 93 of the objective 91 at some distance and opposite the pivoting axis 92 of the tracking bearing-arrangement 103.

For the fixation of the two permanent magnets 110 on the objective support 94 this support is provided with two tabs 113. The two magnets have a bore through which a bolt 114 is passed which clamps the magnets between the tabs 113.

The coil 111 is glued in a holder 115 which is soldered to a sleeve 116 in which the objective 91 is fitted. The leaf springs 104 are connected to the objective via this sleeve.

What is claimed is:

1. A scanning device for reading information recorded in tracks on an optically encoded recording medium, comprising:
   a frame;
   a radiation source means for providing a radiation beam in a given direction;
   an objective lens system means having an optical axis in the path of said radiation beam and oriented along said given direction for focussing said radiation beam on said recording medium;
   a focussing bearing means connected to said frame and to said objective lens system means for permitting focussing movements along said given direction;
   electrically controllable focussing means for driving said objective lens system in said given direction to focus said beam on said recording medium;
   tracking bearing means connected to said objective lens system means and to said frame for permitting the given direction of said radiation beam and the orientation of said optical axis to change, thus permitting tracking movements of the objective lens system in a direction perpendicular to the tracks on the record carrier; and
   electrically controllable tracking means for effecting the tracking movements of the objective system means.

2. An optical scanning device as claimed in claim 1, wherein the objective lens system further comprises optical elements and radiation-sensitive electronic elements in the radiation path of the radiation beam.

3. An optical scanning device as claimed in claim 2, wherein the radiation source means itself is entirely incorporated in the objective lens system means.

4. An optical scanning device as claimed in claim 2, wherein the radiation source means is partially situated outside the objective lens system means, and comprises a radiation source and a filamentary flexible radiation guide connected to the objective system means at one end and disposed in the path of the radiation beam from the radiation source at its other end.

5. An optical scanning device as claimed in claim 2, wherein in the objective system means and outside the part of a radiation beam path which is disposed between the radiation source and the lens system a reflecting surface is provided for reflecting a portion modulated part of the modulated radiation beam reflected by a record carrier, and at least one radiation-sensitive electronic elements in the path of said portion of said modulated radiation beam.

6. An optical scanning device as claimed in claim 5, wherein the reflecting surface is the surface of a single mirror which has a radiation-transmittng portion for transmitting the part of the radiation beam which is directed to the lens system.

7. An optical scanning device as claimed in claim 1, wherein:
   the focussing bearing means comprises a parallel guide-arrangement, and
   the tracking bearing means comprises a pivot bearing-arrangement for enabling a limited pivoting movement of the objective relative to the frame about a pivoting axis which is transverse to the optical axis of the objective system means.

8. An optical scanning device as claimed in claim 7, in which the electrically controllable focussing means comprises:
   a permanent magnetic circuit which comprises an axially magnetized permanent magnet provided with a central opening, and soft-iron end plates at the two axial ends of the permanent magnet, and a hollow cylindrical soft-iron core fitted in the central opening; and
   a cylindrical coil construction which is rigidly connected to the objective system means and which is disposed coaxially around the soft iron core, said cylindrical coil construction being axially movable in an annular air gap around the soft-iron core; and wherein:
   the focussing bearing means comprises a sleeve bearing arrangement comprising a first bearing bush which is connected to the frame and a second bearing bush which is connected to the objective and which is movable relative to the first bearing bush,
   the first bearing bush being pivotably connected to the frame by means of the tracking bearing means, and said coil construction comprises two tracking coils which are disposed symmetrically one on each side of the pivoting axis.

9. An optical scanning device as claimed in claim 8, wherein between each of the two soft-iron end plates and the cylindrical soft-iron core an annular air gap is formed, and part of each tracking coil is disposed in the one air gap and an other part is disposed in the other air gap, in such a way that the said parts of the tracking coil provide an equally directed contribution to an electrically generated pivoting torque.

10. An optical scanning device as claimed in claim 1, wherein:

the focussing bearing means comprises a parallel guide-arrangement, and the tracking bearing a pivot bearing arrangement for enabling a limited pivoting movement of the objective systems means relative to the frame about a pivoting axis which is disposed parallel to and at some distance from the optical axis.

11. An optical scanning device as claimed in claim 10, further comprising:

a movable objective support, and wherein the focussing bearing means movably connects the objective support to the frame, and the tracking bearing means movably connects the objective system means to the objective support.

12. An optical scanning device as claimed in claim 11, wherein:

the focussing bearing means comprises a first number of identical and parallel leaf springs which are spaced from each other, one end of each leaf spring being connected to the frame and the other end to the objective support, and the tracking bearing means comprises a second number of identical leaf springs which are spaced apart from each other in a crosswise fashion, each of said second member of springs having one end connected to the objective support and the other end connected to the objective system means.

13. An optical scanning device as claimed in claim 12, wherein the electrically controllable focussing means comprises a cylindrical axially magnetized permanent magnet which is connected to the frame, and an annular focussing coil which is connected to the objective support and is disposed concentrically around said magnet, said magnet and coil both being coaxial with the objective system means.

14. An optical scanning device as claimed in claim 12, wherein the electrically controllable tracking means comprises an assembly of two cylindrical axial magnetized permanent magnets, connected to the objective support, and being mounted against each other with ends of like polarity, and an annular coil which is disposed concentrically around said assembly and which is connected to the objective, the axis of the tracking means crosses the optical axis of the objective at some distance and opposite the pivoting axis of the tracking bearing-arrangement.

* * * * *